United States Patent [19]

Hinkley et al.

[11] 3,860,659

[45] Jan. 14, 1975

[54] 5-FLUORO-2-METHYL 1-(4'-METHYLSULFINYLBENZYLIDENE)-3-INDENYL ETHANOL

[75] Inventors: David F. Hinkley, Plainfield; John B. Conn, Westfield, both of N.J.

[73] Assignee: Merck & Co., Inc., Rahway, N.J.

[22] Filed: Feb. 6, 1973

[21] Appl. No.: 330,165

Related U.S. Application Data

[62] Division of Ser. No. 33,890, May 1, 1970, Pat. No. 3,732,292.

[52] U.S. Cl................................................ 260/607 A
[51] Int. Cl.......................................... C07c 147/14

[58] Field of Search .................................. 260/607 A

[56] References Cited

UNITED STATES PATENTS 3,642,785    2/1972    Shen et al. ...................... 260/240 R

*Primary Examiner*—James A. Patten
*Attorney, Agent, or Firm*—Mario A. Monaco; Harry E. Westlake, Jr.

[57] ABSTRACT

5-Fluoro-2-methyl-1-(4'-methylsulfinylbenzylidene)-3-indenyl acetic acid is prepared by processes that form the 3-acetic acid side chain as the final step.

1 Claim, No Drawings

5-FLUORO-2-METHYL 1-(4'-METHYLSULFINYLBENZYLIDENE)-3-INDENYL ETHANOL

This is a division of application Ser. No. 33,890, filed May 1, 1970, which issued to Pat. No. 3,732,292 on May 8, 1973.

This invention relates to processes for preparing a novel 5-fluoro-2-methyl-1-(4'-methylsulfinylbenzylidene)-3-indenyl acetic acid of Formula I.

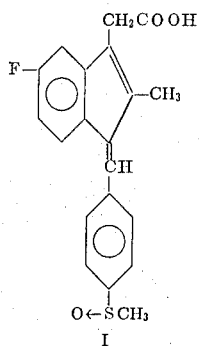

I

This compound has anti-inflammatory, anti-pyretic and analgesic activity and is useful in the treatment of diseases which exhibit pain, fever or inflammation. In the treatment of such diseases, 5-fluoro-2-methyl-1-(4'-methyl-sulfinylbenzylidene)-3-indenyl acetic acid may be administered topically, orally, rectally or parenterally in dosage ranges of from about 0.1 mg. to 50 mg./kg. body weight per day (preferably from about 1 mg. to 15 mg./kg. body weight per day).

It should be noted by one skilled in the art that 5-fluoro-2-methyl-1-(4'-methylsulfinylbenzylidene)-3-indenyl acetic acid may be isomerized into its cis and trans isomers by procedures well known in the art. The cis isomer is that isomeric form in which the benzylidene function is aligned under the phenyl ring of the indene nucleus. It should be further noted that the cis isomer is both chemically more stable and biologically more active than the trans isomer.

It further should be noted by one skilled in the art that the sulfur atom in formula I represents an asymmetric center and that the compound may be resolved into its (+) and (−) forms by procedures well known in the art.

It further should be noted that this compound is polymorphic and has more than one crystalline structure, and hence may be isolated in the solid state with different melting points.

In the past, other 1-benzylidene-3-indenyl acetic acids have been prepared by condensing a substituted benzaldehyde with a substituted acetic acid ester in a Claisen Reaction or with an α-halogenated propionic acid ester in a Reformatsky Reaction. The resulting unsaturated ester was reduced and hydrolyzed to give a β-aryl propionic acid which was ring closed to form an indanone. The aliphatic acid side chain was then introduced by a Reformatsky or Wittig Reaction and the 1-substituent was introduced into the resultant indenyl acetic acid or ester by reacting said acetic acid derivative with an aromatic aldehyde or ketone of the desired structural formula and dehydrating to form the desired indenyl acetic acid.

It is an object of this invention to provide new processes for preparing 5-fluoro-2-methyl-1-(4'-methylsulfinylbenzylidene)-3-indenyl acetic acid.

It is a further object to provide a process for preparing this compound in which the acetic acid side chain is formed as a last step.

In accordance with one aspect of this invention, it has been discovered that compounds of formula:

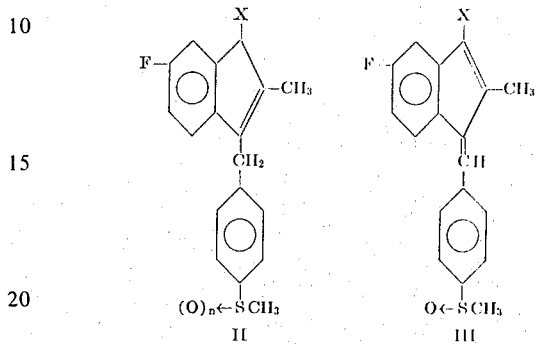

II    III wherein X represents hydrogen, hydroxyl, diazo or halogen and $n = 0$ or $1$ are amenable to substitution in the 3-position with various acetic acid precursors such as glycolic acid, 1,1-dihaloethylene, lower alkyl glyoxylates, triphenyl-phosphine-alkoxycarbonylmethylene, and diazoacetic esters.

The compound of formula II or III wherein X is hydrogen reacts smoothly with haloacetic or glycolic acid to yield the desired product in the presence of base like an aryltrialkylammonium hydroxide such as benzyltrimethylammonium hydroxide (Triton B) in an inert organic solvent under conditions which promote the removal of acid or water from the sphere of reaction such as in the presence of dehydrating agents or by choice of solvent which permits azeotropic distillation of water. A preferred solvent system for this purpose is a mixture of pyridine and benzene.

Where the starting material is of formula III, the process is illustrated as follows:

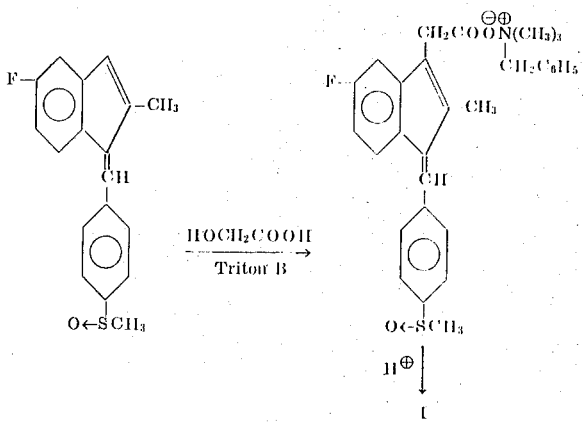

Where the starting material is of Formula II, $n = 0$ or $1$, subsequent exposure of the reaction mixture containing the Triton B to air results in peroxidation at the 3-position which on decomposition causes concomitant dehydrogenation to the fulvene structure and oxidation of the thio-group (where $n = 0$) to the sulfoxide ($n = 1$). This process is illustrated by the following equations:

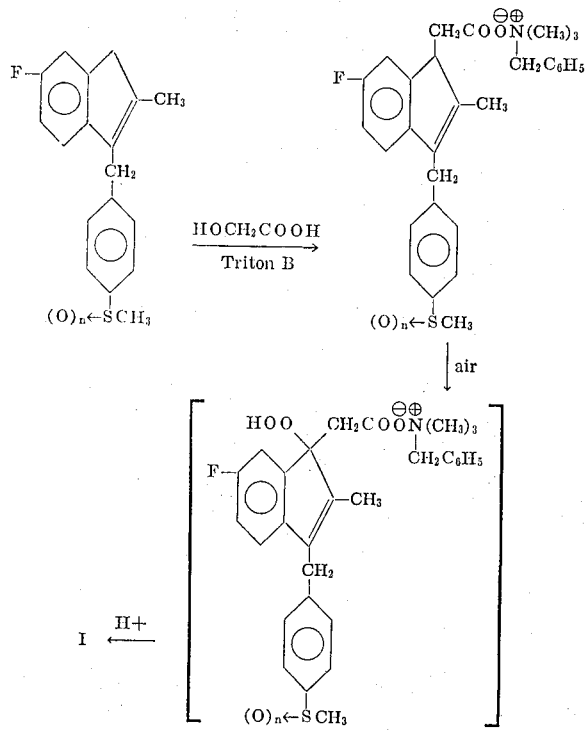

The compound of formula III, wherein X is hydrogen, can be halogenated by chlorine, bromine, their complexes with pyridine bases, or by N-haloamides. The resulting 3-halo compound metalates with lithium, magnesium and the like; reaction of the metalated indene (specifically Grignard reagent) with oxygen yields the compound of Formula III wherein X is hydroxyl. Slow addition of this indenol to a 1,1-dihaloethylene in a mixture of an inert solvent such as dimethoxyethane and similar high boiling ethers and sulfuric acid at about 0°–10°C., followed by treatment with cold water provides 5-fluoro-2-methyl-11(4′-methylsulfinylbenzylidene)-3-indenyl acetic acid. These transformations are represented as follows:

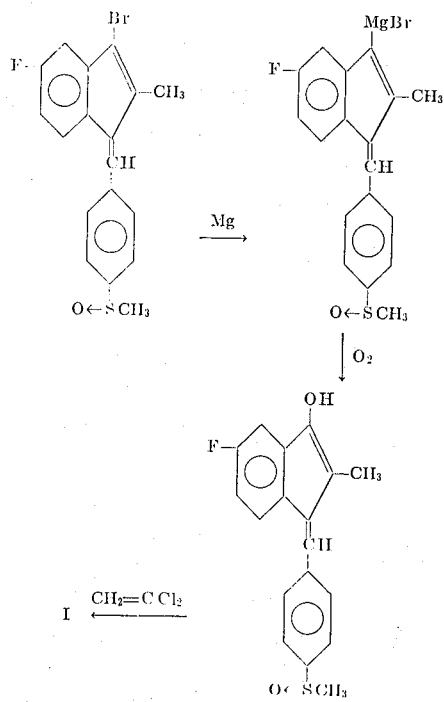

The compound of formula II, wherein X is hydrogen and $n = 1$, reacts with p-toluenesulfonyl azide by known methods to give Compound II, wherein X is $N_2$ and $n = 1$. This diazo compound in solution in an inert solvent such as an ether at −5°C. to about +10°C. on treatment with a lower alkyl glyoxylate provides a compound of formula IV which on treatment with a reducing agent such as chromous chloride, vanadium dichloride, or titanium trichloride results in reduction to the alkene. Hydrolysis of the ester function with acid or alkali results in a tautomeric shift of the double bonds to provide the desired compound.

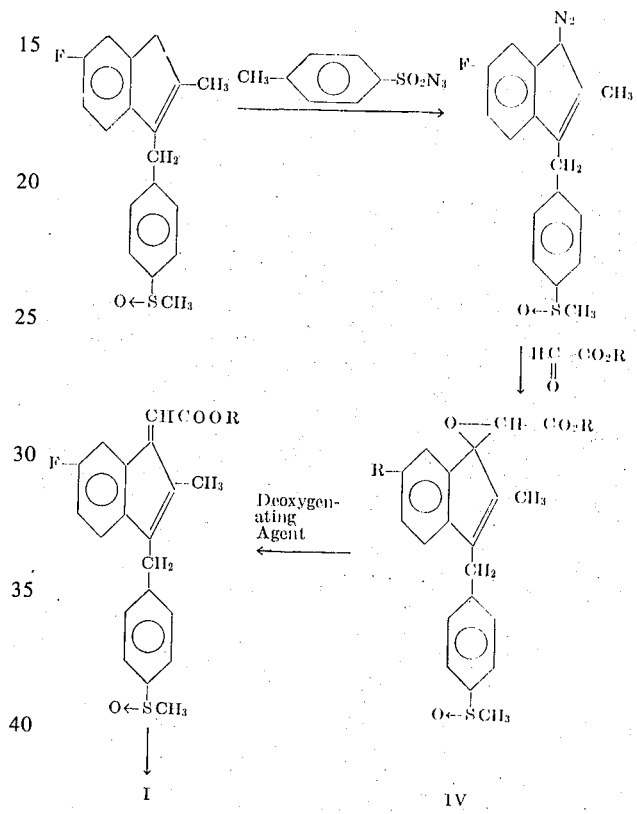

The compound of formula III wherein X is halo, preferably bromo, reacts readily with a Wittig reagent, such as triphenylphosphine-carbalkoxymethylene or trialkylphosphine-carbalkoxymethylene, by heating at from 30°–100°C., in an anhydrous inert solvent such as methylene chloride, chloroform, benzene, or the like. Hydrolysis of the phosphonium salt with alkali results in the desired compound. These transformations are illustrated as follows:

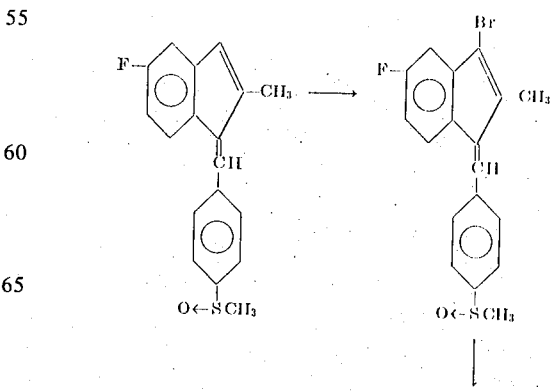

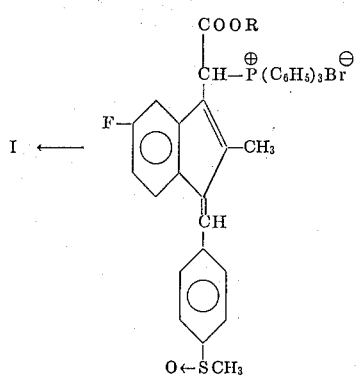

The compound of Formula III wherein X is hydrogen reacts with an ester of diazoacetic acid in a solvent such as dioxane, t-butanol or hexane in the presence of a catalyst such as metallic copper, copper sulfate or light, at a temperature between ambient and 150°C., in a vented autoclave where necessary, to provide the 5-fluoro-2-methyl-1-(4'-methylsulfinylbenzylidene-3-indenyl acetic acid. This reaction is represented as follows:

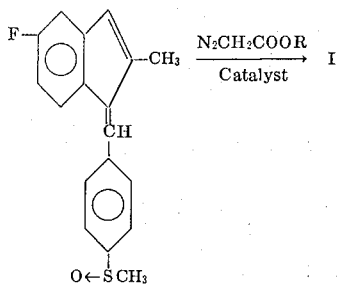

In accordance with another aspect of this invention compounds of formula III wherein X is a 1 carbon substituent such as methyl, halomethyl, formyl or carboxyl can be converted to the desired indenyl acetic acid by various procedures.

Compound III wherein X is hydrogen is readily methylated with dimethyl sulfate by standard techniques to give a 3-methylindene which on treatment with carbon dioxide in a solvent such as chlorobenzene, benzene or ether in the presence of a catalyst such as phenylsodium, phenyl-potassium, sodamide, ethylmagnesium chloride, potassium t-butoxide or sodium hydride causes extension of the 3-position side chain to an acetic acid derivative. The above transformations are illustrated as follows:

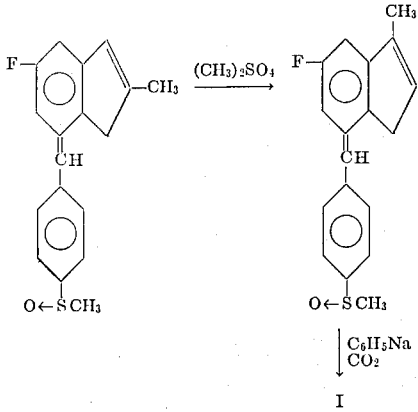

A compound of Formula II wherein X is hydrogen reacts readily with methylmagnesium bromide under standard Grignard conditions to provide a 3-indenylmagnesium bromide which on treatment with formaldehyde yields a compound of Formula II wherein X is a methanol residue. The indenyl methanol is then converted to the corresponding methyl sulfite by treatment with thionyl chloride in the presence of pyridine and then to the 3-indenyl-methyl bromide by treatment with thionyl bromide. Alternatively the 3-indenyl-methanol can be brominated directly with excess thionyl bromide. This product is then dehydrogenated by bromination with N-bromosuccinimide and dehydrobromination to provide the compound of Formula III wherein X is bromomethyl. This product is then converted to the desired end compound by formation of a Grignard reagent under standard conditions followed by treatment with dry carbon dioxide, again under standard conditions. These reactions are illustrated as follows:

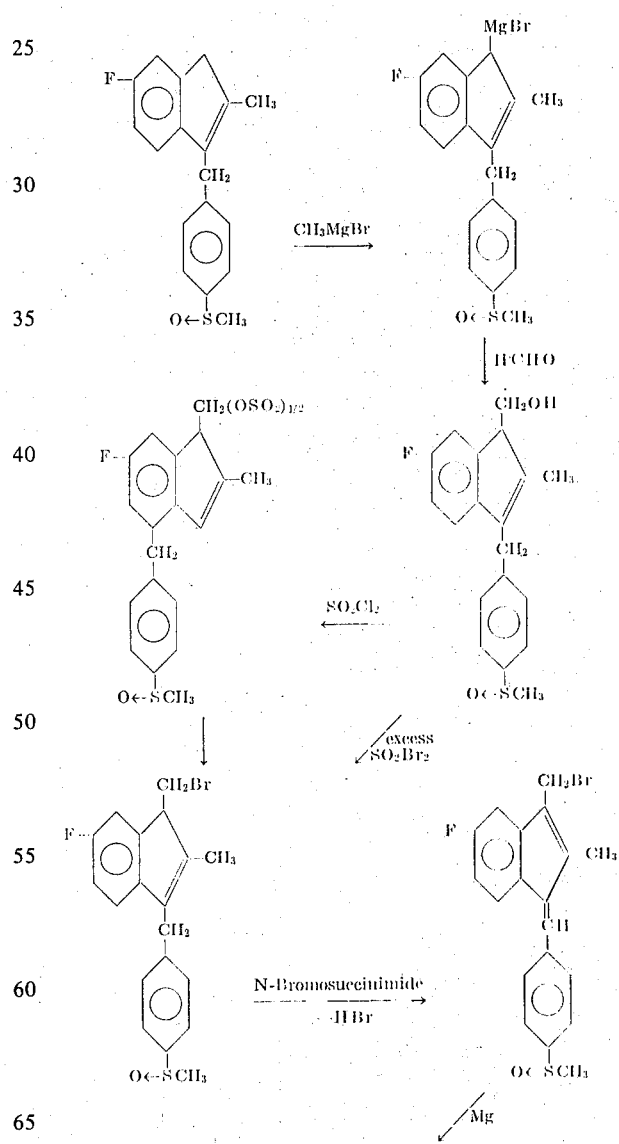

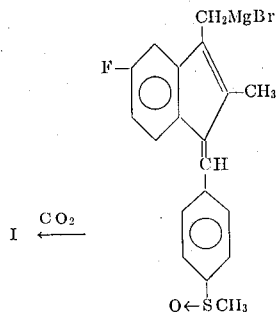
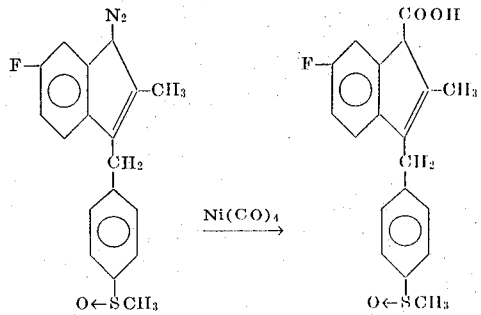
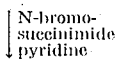
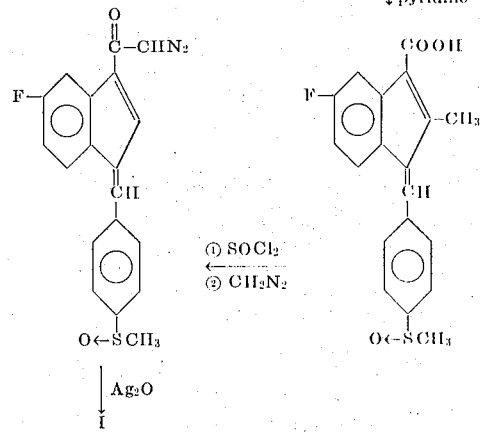

The compound of Formula II wherein X is hydrogen an $n = 1$ on treatment with ethylformate and a strong base such as an alkali metal alkoxide in anhydrous ether under refluxing, produces a 3-formyl (hydroxymethylene) compound. This 3-indenyl aldehyde is carbonated in a bomb in the presence of nickel carbonyl and nickel chloride hexahydrate and hydrochloric acid by pressurizing to 500–1000 p.s.i. with carbon monoxide gas and heating to from 200–500°C. When the uptake of carbon monoxide has ceased the bomb is cooled, vented and its contents are poured into water and made alkaline from which the desired compound is isolated. These transformations are illustrated by the following equation:

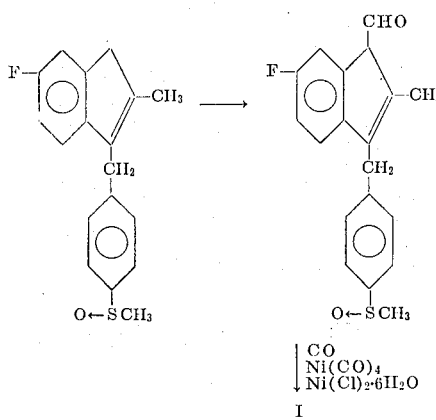
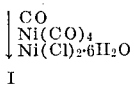

The compound of formula II wherein X is diazo and $n = 1$ can be carbonated by treatment with nickel carbonyl and absolute ethanol to provide an indene-3-carboxylic acid ester. Hydrolysis of the ester and bromination of the indene-3-carboxylic acid with N-bromosuccinimide and dehydrobromination with pyridine provides the compound of Formula III wherein X is carboxyl. The 3-indenyl carboxylic acid is converted to the acid chloride by treatment with thionyl chloride in the usual manner, the product is taken up in an inert solvent such as an ether, and diazomethane in ether solution is slowly added thereto. The diazo ketone is recovered and treated in aqueous alcoholic solution with silver oxide, copper or platinum powder, or with silver benzoate and a tertiary base such as a trialkylamine which converts the diazo ketone to the corresponding acetic acid. The above transformations can be illustrated by the following equations:

According to a third aspect of this invention, a compound of Formula III wherein X is a 2-carbon chain such as ethanol, acetaldehyde, acetonitrile, nitroethane, or a trihaloethane can be converted to the desired compound by appropriate modification of the β-carbon, such as oxidation or hydrolysis.

Alkylation of the compound of Formula II, wherein X is hydrogen and $n$ is 1, with ethylene oxide provides a 3-indenyl ethanol. Oxidation of the ethanol side chain to the aldehyde can be accomplished by aeration of a solution at 30°–100°C. in the presence of a noble metal such as platinum or palladium. This 3-indenyl acetaldehyde can be oxidized further to the desired end product by continuing the aeration in the presence of bicarbonate. Alternatively the aldehyde can be oxidized to the indenyl acetic acid by inorganic oxidizing agents such as dichromate or permanganate or by silver oxide in dilute caustic solution or by hydrogen peroxide or organic peracids under the usual conditions. The above transformations are illustrated by the following equation:

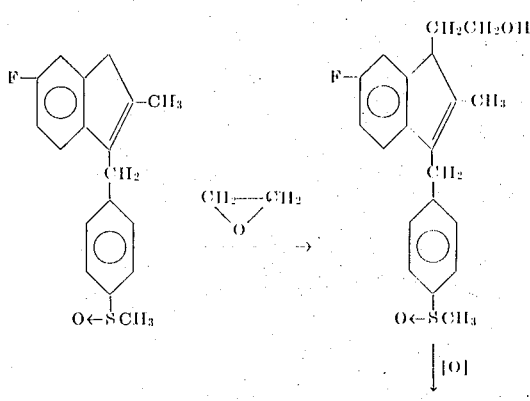

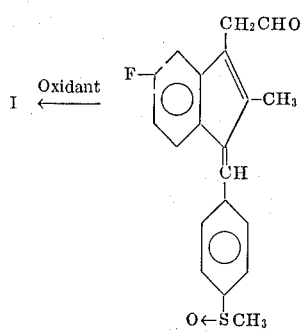

A 3-bromomethyl indene or treatment with sodium cyanide in dimethyl sulfoxide produces the corresponding 3-indenyl acetonitrile which on hydrolysis with dilute sulfuric acid provides the desired indenyl acetic acid as shown by the following equation:

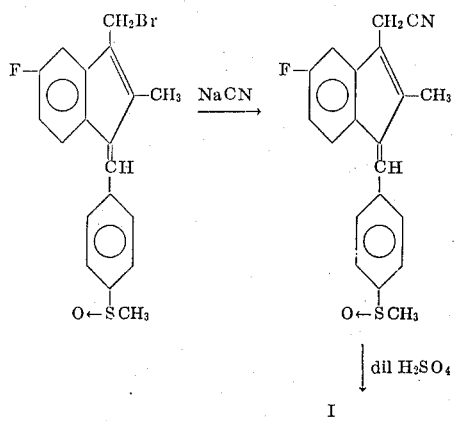

Treatment of a compound of Formula III, wherein X is hydrogen and n is 1, with 2-nitroethanol in the presence of Triton B or similar base produces the 3-indenyl-β-nitroethane. Heating of this compound to 100°–150°C. in an autoclave in a strong mineral acid such as hydrochloric, sulfuric or phosphoric acid provides the 3-indenyl acetic acid. These reactions are illustrated as follows:

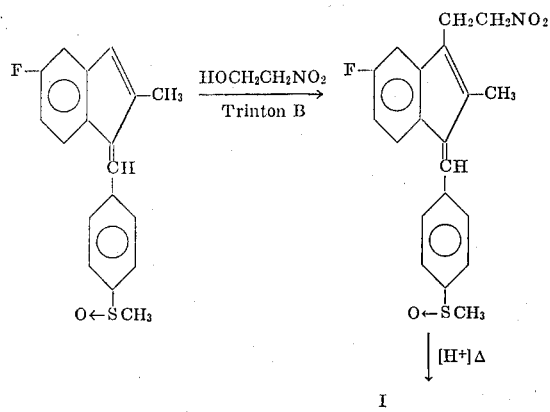

In accordance with a fourth aspect of this invention, compounds of Formula III, wherein X is a 2-carbon chain, such as a glyoxylic acid, a glyoxime, an α-hydroxy acid, a cyanohydrin, an α-cyano acid, or a malonic acid can be converted to the desired compound by appropriate modification of the α-carbon.

Condensation of Compound II, wherein X is hydrogen and n is 1, with a dialkyl oxalate produces a 3-indenyl glyoxylate which on bromination and dehydrobromination as previously described yields a benzylidene-indenyl glyoxylic acid. Wolff-Kishner reduction of this glyoxylic acid with hydrazine hydrate in ethanol or glycol in the presence of a strong base such as an alkali metal alkoxide or an alkali metal hydroxide provides the desired indenyl acetic acid. The reaction is represented by the following equation:

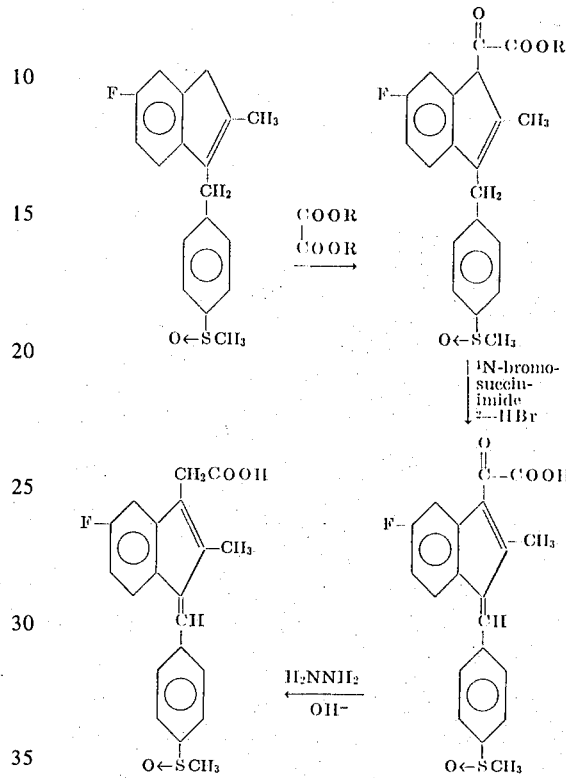

The compound of Formula II wherein X is hydrogen and n is 1 can be acetylated in the 3-position with acetyl chloride to give the 3-acetyl product which can be dehydrogenated through the use of N-bromosuccinimide and dehydrobromination as previously described. Nitrosation with nitrous acid under the usual conditions produces a 3-α-oximino ketone. Treatment of this glyoxime with hydrazine in refluxing diethylene glycol or other similar high boiling alcohols in the presence of a strong base such as alkali metal hydroxides or alkoxides, followed by slow cooling in the presence of air and acidification provides the desired compound. These transformations are represented by the following equations:

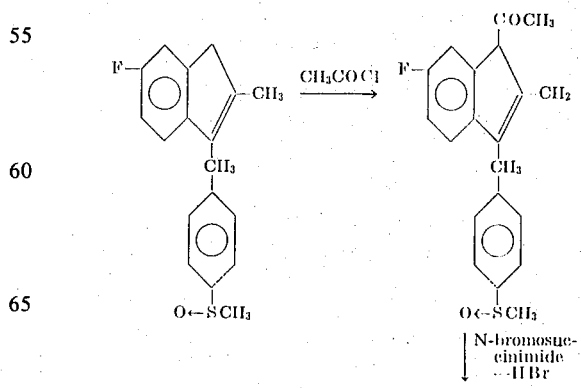

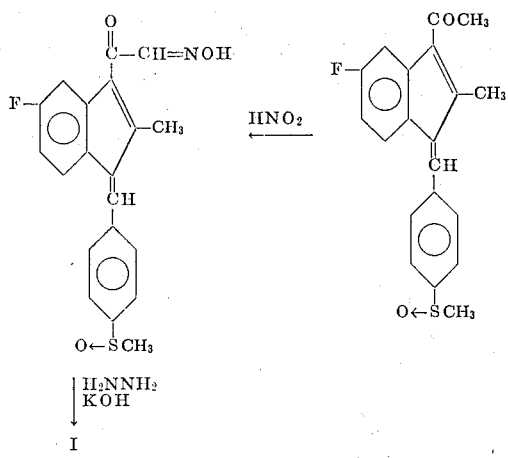

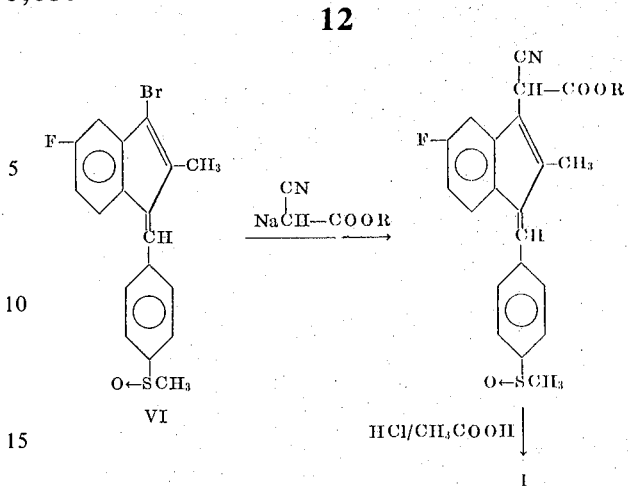

The 3-hydroxymethylene derivative (Formula V) can be converted to the corresponding cyanohydrin by standard Kiliani synthesis. The cyanohydrin is then hydrolyzed to the α-hydroxy acid with a carboxylic or hydrohalic acid and perchloric acid which on treatment with hydrogen in the presence of a palladium on carbon catalyst under the hydrolytic conditions produces the desired 3-indenyl acetic acid in accordance with the following equations:

The 3-bromo compound VI on treatment with the sodio derivative of dialkyl malonate by standard techniques provides the corresponding indenyl malonate derivative which on acidification with a strong acid such as sulfuric acid or hydrochloric acid causes decarboxylation and production of the 3-indenyl acetic acid according to the following equations:

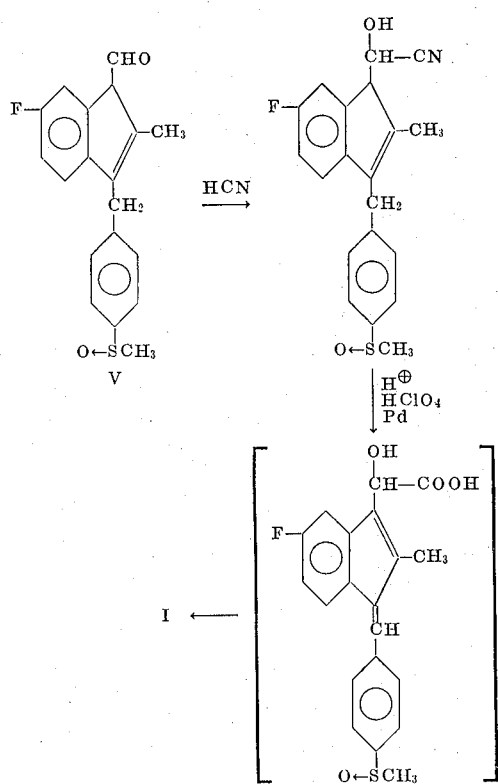

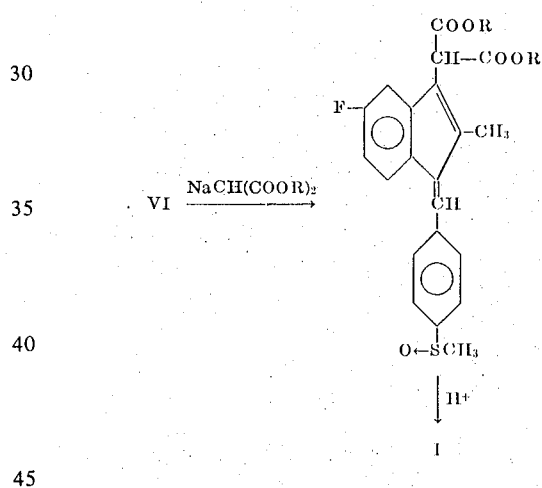

The 3-bromoindene (Compound VI) on treatment with a sodio derivative of an alkyl cyanoacetate by standard techniques provides a 3-indenyl-α-cyanoacetate which on prolonged refluxing in a mixture of hydrochloric acid (or hydrobromic)-alkanoic acids converts the α-cyanoacetate to the desired acetic acid side chain in accordance with the following equation:

In accordance with a fifth aspect of this invention, compounds of Formula III, wherein X is a multi-carbon side chain, can be converted to the desired 3-indenyl acetic acid by various degradative procedures.

The compound of Formula II, wherein X is hydrogen and n is 0, reacts with formaldehyde in the presence of a strong base such as an alkali metal alkoxide to provide the 3-methylene product. This compound on treatment with dry cyclohexene and a diborane provides the compound of Formula VII which on treatment with carbon monoxide and hydrogen peroxide yields the corresponding cyclohexylketone. Dehydrogenation as previously described followed by treatment of the cyclohexylketone with any peracid such as metachloroperbenzoic, trichloroperacetic, or fluorodichloroperacetic acid in trifluoroacetic acid and saponification with alcoholic alkali metal hydroxides degrades the cyclohexyl ketone to the desired acetic acid with simultaneous oxidation of the methylthio group to the methylsulfinyl group. These transformations are illustrated by the following equations:

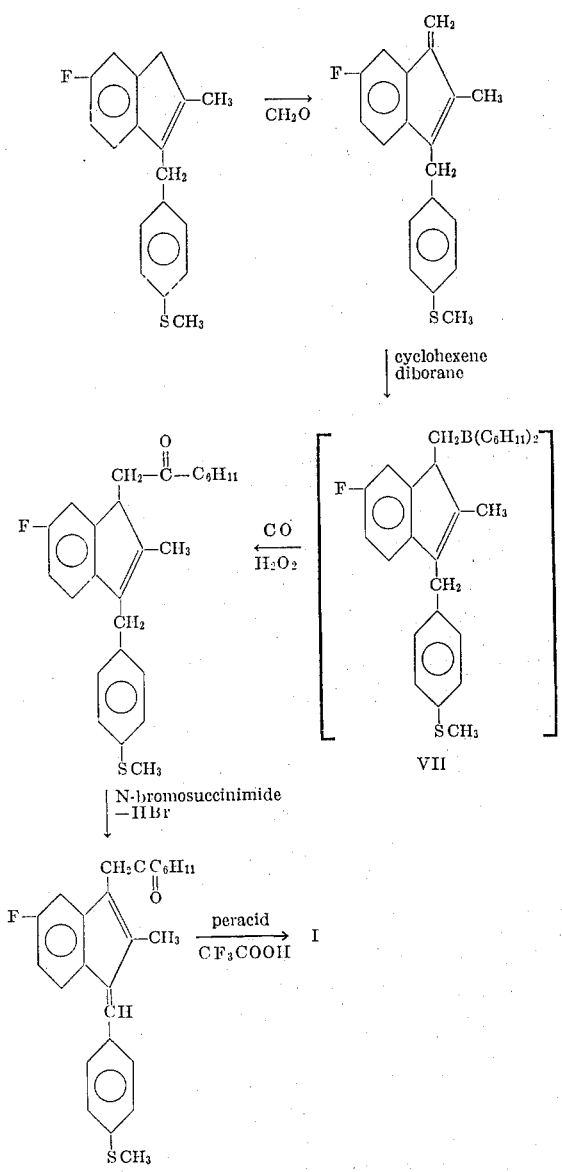

Condensation of Compound II wherein X is hydrogen and n is 1 with chloroacetone under standard conditions provides the indenyl(2-propanone). This propanone undergoes a standard haloform reaction on treatment with sodium hypochlorite, hypobromite or hypoiodite in a solvent such as dioxane, tetrahydrofuran or dimethylsulfoxide to produce the desired indenyl acetic acid in accordance with the following equation:

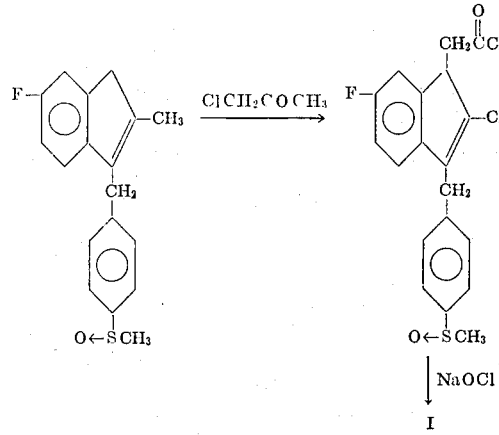

The compound of Formula II, wherein X is hydrogen and n is 0 or 1, condenses with allyl chloride in the presence of a base to provide the 3-allyl indene. Ozonization of this compound in an alkanoic acid followed by oxidation with hydrogen peroxide, chromium trioxide, alkaline permanganate, or silver oxide converts the allyl group to the desired acetic acid group and the thio-group to the sulfinyl-group. These transformations are illustrated by the following equation:

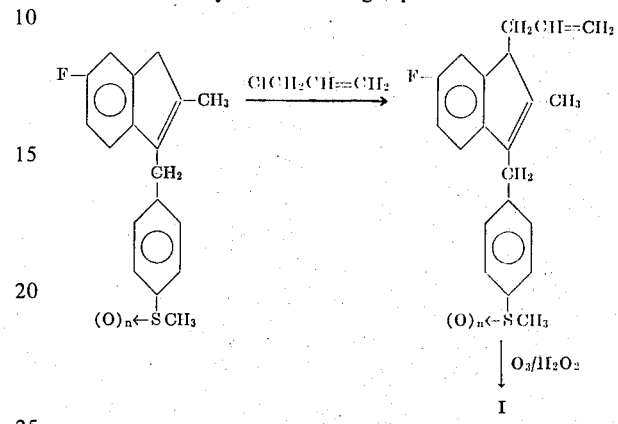

The compound of Formula II, wherein X is hydrogen and n is 0, condenses with β-propiolactone in anhydrous refluxing pyridine to provide a 3-indenyl propionic acid which is readily esterified to the lower alkyl ester by known procedures. This ester can then be dehydrogenated with N-bromosuccinimide and pyridine as previously described. Reaction of this ester with two moles of phenylmagnesium bromide in ether provides the tertiary alcohol indicated below which can be dehydrated to the olefin with simultaneous oxidation of the thioether to the sulfoxide by heating with anhydrous dimethylsulfoxide at reflux to provide the diphenylpropene, which on oxidation with an oxidant such as chromium trioxide or similar oxidants provides the desired indenyl-3-acetic acid. These transformations are indicated in the following equations:

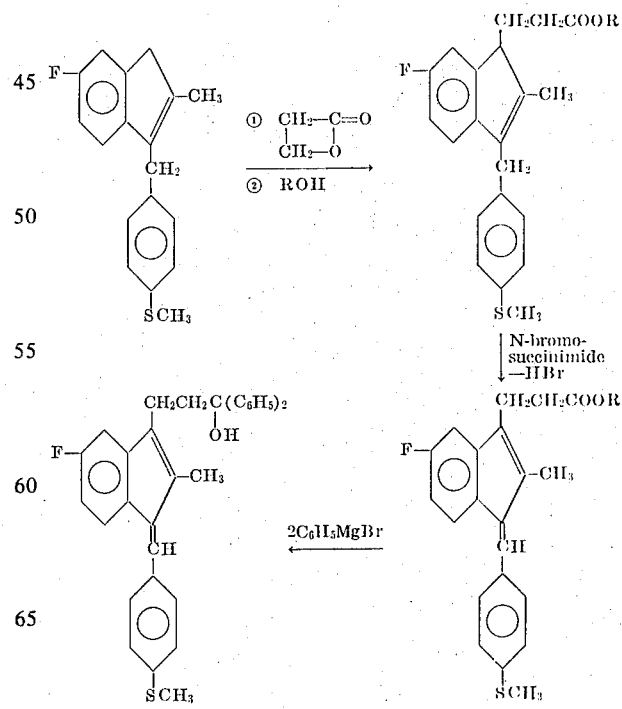

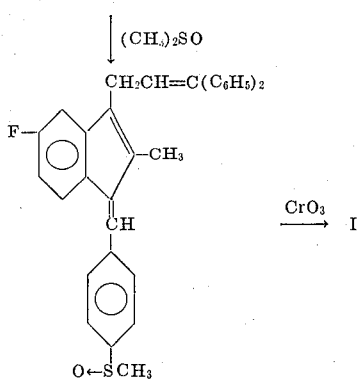

In accordance with a sixth aspect of this invention compounds of Formula III wherein X represents a 2-carbon residue such as acetyl and halo acetyl can be rearranged to form the desired indenyl acetic acid.

3-Acetyl-5-fluoro-2-methyl-1-(4'-methylsulfinylbenzyl) indene undergoes a Willgerodt rearrangement or the Kindler modification thereof to produce the desired acetic acid derivative with concomitant dehydrogenation. This process is outlined in the following equation:

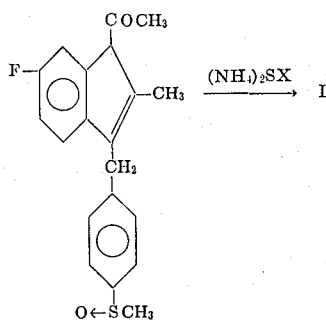

Condensation of Compound II, wherein X is hydrogen and n is 1, with chloroacetyl chloride yields the 3-chloroacetyl indene. This product suffers a Favorskii rearrangement to the indene acetic acid on treatment with a strong base such as alkali metal hydroxides or alkoxides in refluxing xylene or glycols of similar boiling point in accordance with the following equations:

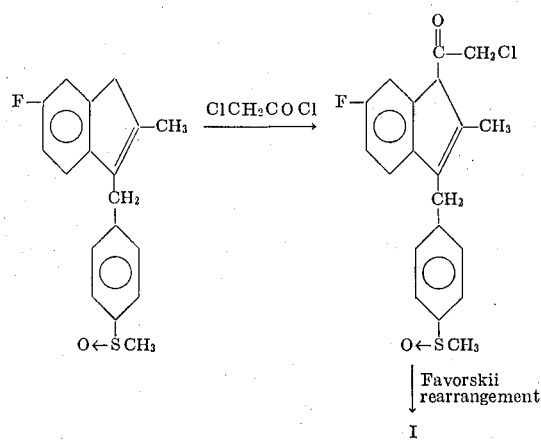

In accordance with a seventh aspect of this invention numerous derivatives of the acetic acid side chain are subject to conversion to the free acetic acid by various procedures.

Many esters such as simple alkyl esters and others such as the dihydropyranyl, t-butyl, vinyl and silyl esters are subject to acid hydrolysis. Similarly amides and anhydrides of the acetic acid side chain are subject to acid hydrolysis to provide the desired indenyl acetic acid.

Almost all esters, amides and anhydrides are also subject to hydrolysis under the influence of alkali.

Certain esters such as the trimethyl silyl esters and other trialkyl silyl esters are subject to uncatalyzed hydrolysis providing the desired acetic acid by treating them with water.

Many esters of the indenyl acetic acid such as the t-butyl and the tetrahydropyranyl ester provide the indenyl acetic acid on thermal cleavage of the ester grouping. In the presence of a catalytic amount of p-toluenesulfonic acid.

Other esters such as the benzyl ester can be cleavage by hydrogenolysis in the presence of a suitable hydrogenation catalyst.

The following examples are presented to further illustrate the present invention.

EXAMPLE 1

Step A: α-Methyl-3-nitrocinnamic acid

A mixture of 150 g. (1 mole) 3-nitrobenzaldehyde, 200 g. propionic anhydride, and 96 g. (1 mole) sodium propionate is kept at 170°C. for 5 hours with occasional stirring. The product is cooled, poured into 1 l. water, and made strongly alkaline by portionwise addition of sodium carbonate under stirring. The dark liquid is boiled with decolorizing carbon until a centrifuged portion gives a colorless supernatant, then filtered and acidified with hydrochloric acid. The precipitated α-methyl-3-nitrocinnamic acid is collected, dried, and recrystallized from ethanol.

Step B: α-Methyl-3-aminohydrocinnamic acid

The product of Step A, dissolved in 2,500 ml. absolute ethanol is reduced at room temperature under 40 p.s.i. hydrogen (palladium/charcoal) until the equivalent of 4 moles hydrogen is absorbed. After removal of catalyst, the ethanol is evaporated under reduced pressure, whereupon the amino acid crystallizes.

Step C: α-Methyl-3-fluorohydrocinnamic acid

α-Methyl-3-aminohydrocinnamic acid (179 g., 1 mole) is suspended in 2 l. 4N-hydrochloric acid, cooled to −5°C., and is diazotized under stirring with a solution of 88 g. sodium nitrate in 250 ml. water at such a rate as to prevent any temperature rise. To the clear solution at −5°C., 350 ml. hexafluorophosphoric is added all at once with some dry ice to control temperature. The precipitate of diazonium hexafluorophosphate is collected on a filter, washed well with water, and dried in vacuo at room temperature. The salt is pyrolyzed in 20–30 gram lots under 200 ml. xylene at 125°C. until gas evolution ceases. The cooled mixture is extracted with sodium bicarbonate solution to separate α-methyl-3-fluorohydrocinnamic acid from neutral by-products, and the extract is decolorized with carbon. From the colorless filtrate, the low-melting subject acid is recovered by acidification at 0°C. and scratching until the initially oily precipitate crystallizes.

Step D: 5-Fluoro-2-methylindanone

The product of Step C is heated with 10 times its weight of polyphosphoric acid at 80°–90°C. for 2 hours. The liquid is poured into 1 l. of ice water, stirred for one-half hour, and extracted with three 100 ml. portions of ether. The combined extracts are washed with water and sodium bicarbonate solution until the ether phase is neutral, after which the extract is dried over sodium sulfate and concentrated to leave 5-fluoro-2-methylindanone as a yellowish oil.

Step E: 5-Fluoro-2-methyl-1-(4'-methylthiobenzyl)-1-indanol

A solution of 4-methylthiobenzylmagnesium bromide is prepared from 45.8 g. 4-methylthiobenzyl bromide (0.2 mole) in 500 ml. ether. This is added dropwise to a rapidly-stirred solution of 32.8 g., (0.2 mole) 5-fluoro-2-methyl-indanone in 1 l. anhydrous ether at 0°C., the rate being such that the Gilman test for free Grignars reagent is never positive. At the conclusion, the cold mixture is quenched with 500 ml. saturated aqueous ammonium chloride; the ether phase is separated, washed free from ammonium chloride with water, dried over magnesium sulfate, and concentrated to the indanol residue under reduced pressure.

Step F: 5-Fluoro-2-methyl-1-(4'-methylthiobenzyl)indene

The product of Step E is taken up in a mixture of 600 ml. anhydrous ether and 60 ml. anhydrous pyridine. Under stirring and protection from moisture, the solution is chilled to −10°C. and treated dropwise with 31 g. thionyl chloride. When the reaction is complete, the mixture is allowed to reach room temperature spontaneously under stirring, then poured into 1 l. water. After thorough mixing, the ether layer is separated, washed with water, dried over magnesium sulfate, and concentrated. The residue is recrystallized from hexane.

Step G: 5-Fluoro-2-methyl-1-(4'-methylsulfinylbenzylidene)-3-indenyl acetic acid A solution of 7.61 g. (0.1 mole) crystalline glycolic acid in 120 ml. pyridine is neutralized by addition of a 40% solution of benzyltrimethylammonium hydroxide (Triton B) in pyridine (about 42 ml.); then 1 ml. extra Triton B is added, followed by 50 ml. benzene. The solution, in a flask fitted with a fractionating column and nitrogen inlet tube, is thoroughly de-aerated with pure nitrogen and 33.04 g. (0.1 mole) 5-fluoro-2-methyl-1-(4'-methylthiobenzyl)indene is added. While maintaining the nitrogen sweep, the mixture is heated to very slow distillation. Benzene-water-pyridine heteroazeotrope condenses; heating is maintained until no more water appears. Benzene is then removed.

The above solution is allowed to cool to room temperature. The nitrogen source is disconnected, and the solution is allowed to stir with access to air. Formation of 3-indenyl peroxide results both in dehydrogenation to fulvene and oxidation of thioether to sulfoxide. The exposure is allowed to continue until a test sample under nitrogen shows no persistent peroxide by starch-iodide test. The pyridine is then removed under vacuum, and the residue is treated with 200 m. N acetic acid, thereby precipitating the crude 5-fluoro-2-methyl-1-(4'-methylsulfinylbenzylidene)-3-indenyl acetic acid, which is then purified by recrystallization, m.p. 184°–186°C.

EXAMPLE 2

Step A: 5-Fluoro-2-methyl-1-(4'-methylsulfinylbenzyl)indene

To a solution of 0.1 mole of 1-(4'-methylthiobenzyl)-2-methyl-5-fluoroindene in 100 ml. benzene there is added dropwise under stirring 1,086 g. (0.1 mole) of t-butyl hypochlorite. When the initial yellow color has faded out, the solvents are removed under reduced pressure and the sulfoxide residue is used directly in the next step.

Step B: 5-Fluoro-2-methyl-1-(4'-methylsulfinylbenzylidene)-3-indenyl acetic acid Employing the procedure of Example 1, Step G, but substituting the sulfoxide from Example 2, Step A, for the thio-compound used in Example 1, Step G, there is produced 5-fluoro-2-methyl-1-(4'-methylsulfinylbenzylidene)-3-indenyl acetic acid, m.p. 184°–186°C.

EXAMPLE 3

Step A: 5-Fluoro-2-methyl-1-(4'-methylsulfinylbenzylidene-indene

5-Fluoro-2-methyl-1-(4'-methylsulfinylbenzyl)indene (0.1 mole) from Example 2, Step A, 7.68 g. (0.043 mole) N-bromosuccinimide, and 0.8 g. benzoyl peroxide in 800 ml. dry carbon tetrachloride is heated to reflux in sunlight or equivalent UV source for 50 minutes. After cooling and filtering from some succinimide, the carbon tetrachloride is evaporated, leaving a residue of 3-bromo-5-fluoro-2-methyl-1-(4'-methylsulfinylbenzyl)indene which is recrystallized from carbon tetrachloride.

The bromo compound is dissolved in 200 ml. anhydrous pyridine and refluxed for 3 hours. The dark product is poured into ice-water and acidified with concentrated hydrochloric acid. The precipitate, 5-fluoro-2-methyl-1-(4'-methylsulfinylbenzylidene)indene is collected and recrystallized from carbon tetrachloride.

Step B: 5-Fluoro-2-methyl-1-(4'-methylsulfinylbenzylidene)-3-indenyl acetic acid Employing the procedure of Example 1, Step G, but substituting for the 5-fluoro-2-methyl-1-(4'-methylthiobenzyl)indene used therein, an equivalent amount of the product from Step A, and omitting the peroxidation step, there is produced 5-fluoro-2-methyl-1-(4'-methylsulfinylbenzylidene)-3-indenyl acetic acid, m.p. 184°–186°C.

EXAMPLE 4

Step A: 1-(4'-Methylsulfinylbenzylidene)-2-methyl-5-fluoro-inden-3-ol

A Grignard reagent is prepared from 3-bromo-5-fluoro-2-methyl-1-(4'-methylsulfinylbenzylidene)-indene (from Example 6, Step A) and magnesium metal by standard techniques in tetrahydrofuran. The solution under ice-cooling and stirring, is treated with a steam of dry oxygen until heat evolution has ceased. The oxidation product is quenched with saturated ammonium chloride; the organic phase is separated and the aqueous phase is extracted 3 times with 50 ml. portions of benzene. The combined extracts are washed with water, dried over sodium sulfate, and the solvents are evaporated to crystallize 1-(4'-methylsulfinylbenzylidene)-2-methyl-5-fluoroinden-3-ol.

Step B: 1-(4'-methylsulfinylbenzylidene)-2-methyl-5-fluoro-indene-3-acetic acid

A mixture of the above indenol (0.05 mole), 14.6 g. (0.15 mole) 1,1-dichloroethylene, and 100 ml. dimethoxyethane is dropped into a mixture of 50 ml. dimethoxyethane and 20 ml. 90 % sulfuric acid at 5°C., with good stirring over a period of 1 hour. Stirring is continued for another hour, then the mixture is quenched in a mush of shaved ice and water. The emulsion is extracted with benzene until clear. The benzene extract is in turn shaken with 100 ml. N sodium hydroxide; the aqueous phase is separated, and acidified to precipitate 1-(4'-methylsulfinylbenzylidene)-2-methyl-5-fluoroindene-3-acetic acid.

EXAMPLE 5

Step A: 3-Diazo-5-fluoro-2-methyl-1-(4'-methylsulfinylbenzyl)indene

A mixture of 5-fluoro-2-methyl-1-(4'-methylsulfinylbenzyl)indene (0.1 mole), 20 g. (0.1 mole) p-toluenesulfonylazide, and 10 ml. diethylamine in 50 ml. cyclohexane is kept at 0°C. for 3 days. The solvents are pumped off and the residue is dissolved in 300 ml. ether.

Step B: 2-Methyl-3-(4'-methylsulfinylbenzyl)-6-fluoro-10-carbethoxybenzofulvene-1,8-oxide The product of Step A is treated at 0°C. with 10.21 g. (0.1 mole) ethylglyoxylate, and the mixture is allowed to stand at 0°C. until nitrogen evolution has ceased, and the orange color of the diazo compound has faded. The ether is removed, and the oily residue is purified by silica gel chromatography.

Step C: 2-Methyl-3-(4'-methylsulfinylbenzyl)-6-fluoro-10-carbethoxybenzofulvene

The product of Step B (21.44 g., 0.05 mole) is dissolved in 350 ml. glacial acetic acid in a 500 ml. flask under nitrogen sweep, and a standardized solution of chromous chloride in dilute hydrochloric acid containing 1.2 moles (excess) of $Cr^{++}$ is introduced by syringe. The mixture is allowed to remain under nitrogen overnight, after which water and acetic acid are removed under vacuum, the residue is extracted with benzene, and the fulvene is purified by chromatography.

Step D: 5-Fluoro-2-methyl-1-(4'-methylsulfinylbenzylidene)-3-indenyl acetic acid The ester of Step C is heated with alcoholic potassium hydroxide, to effect simultaneous saponification and rearrangement of the indene double bond to produce 5-fluoro-2-methyl-1-(4'-methylsulfinylbenzylidene)-3-indenyl acetic acid, m.p. 184°–186°C.

EXAMPLE 6

Step A: 3-Bromo-5-fluoro-2-methyl-1-(4'-methylsulfinylbenzylidene)indene

The product of Example 3, Step A, (0.05 mole) is dissolved in 100 ml. dry acetic acid and under stirring, pyridinium hydrobromide perbromide is sifted in at such a rate that coloration does not persist. A total of about 16 g. is required to this point. The product is poured into water containing a little sulfurous acid, and the precipitated bromo compound is recrystallized from benzene.

Step B: Triphenyl-(1,(4'-methylsulfinylbenzylidene)-2-methyl-5-fluoro-3-indenyl) carbethoxymethyl phosphonium bromide A mixture of (0.05 mole) of the above bromo compound and 17.42 g. (0.05 mole) triphenylphosphine-carbethoxymethylene is taken up in 200 ml. anhydrous methylene chloride and refluxed under nitrogen. The quaternary phosphonium bromide gradually separates and is recrystallized from ethyl acetate-chloroform mixture.

Step C: 5-Fluoro-2-methyl-1-(4'-methylsulfinylbenzylidene)-3-indenyl acetic acid The phosphonium salt from Step B (0.025 mole) is heated under reflux with 200 ml. N potassium hydroxide in water ethanol 1:1 for 1 hour. After cooling, the mixture is poured into 2 l. water, and the triphenylphosphine oxide which separates is filtered off. The subject acid of this example is recovered by acidification of the filtrate, and has m.p. 184°–186°C.

EXAMPLE 7

5-Fluoro-2-methyl-1-(4'-methylsulfinylbenzylidene)-indene (15 g., 0.05 mole) from Example 3A, in 100 ml. of dioxane containing a gram of copper powder is stirred with an equivalent of t-butyl diazoacetate in 50 ml. of dioxane at 25°C. for 6 hours while isobutene and nitrogen are evolved. Filtration, carbon treatment and evaporation in vacuo to a small volume gives 5-fluoro-2-methyl-1-(4'-methylsulfinylbenzylidene)-3-indenyl acetic acid, which on recrystallization from ethylacetate has m.p. 184°–186°C.

EXAMPLE 8

Step A: 2,3-Dimethyl-5-fluoro-1-(4'-methylsulfinylbenzylidene)indene

The 5-fluoro-2-methyl-1-(4'-methylsulfinylbenzylidene)indene (from Example 3A) is methylated with dimethyl sulfate by standard techniques.

Step B: 5-Fluoro-2-methyl-1-(4'-methylsulfinylbenzylidene)-3-indenyl acetic acid The product of Step A (15.6 g., 0.05 mole) is added to 0.05 mole of phenylsodium in chlorobenzene prepared from excess of chlorobenzene and sodium metal under nitrogen at 35°C. The mixture is refluxed under nitrogen for an hour and then treated with carbon dioxide gas at 50°C. to cessation of absorption. Acidification to cessation of carbonate evolution then precipitates the product, which on recrystallization gives product, m.p. 184°–186°C.

EXAMPLE 9

Step A: 5-Fluoro-2-methyl-1-(4'-methylsulfinylbenzyl)-3-indenyl methanol

The product from Example 2, Step A, (0.1 mole) is dissolved in 200 ml. dry tetrahydrofuran, and with stirring under nitrogen, 50 ml. of commercial 2 N methylmagnesium bromide in tetrahydrofuran-benzene mixture is added dropwise under reflux. When evolution of methane has ceased dry formaldehyde gas is swept over the rapidly stirred and ice cooled solution, until the Gilman test is negative. The mixture is quenched with saturated ammonium chloride, and the indenol is extracted with three 100 ml. portions of benzene. The extract is washed three times with water, dried over sodium sulfate, and concentrated to crystallization.

Step B: 5-Fluoro-2-methyl-1-(4'-methylsulfinylbenzyl)-3-indenylmethyl bromide

The product of Step A, 17.92 g., (0.05 mole) is dissolved in 100 ml. fresh dry toluene, 3.96 g., (0.05 mole) dry pyridine is added, and under ice cooling, a solution of 2.97 g. (0.025 mole) thionyl chloride in 25 ml. dry toluene is added dropwise with stirring. At conclusion of the reaction, the toluene solution of indenylmethyl sulfite is filtered from pyridine hydrochloride, and then treated with 80 mg. dry pyridine hydrobromide. The suspension is again cooled to 0°C., and, with stirring, 5.20 g. (0.025 mole) thionyl bromide in 50 ml. toluene is added dropwise. Stirring is continued there-after until no more sulfur dioxide is evolved. The combined solvents are removed at room temperature under vacuum, and the residue is used immediately in the following step.

Step C: 5-Fluoro-2-methyl-1-(4'-methylsulfinylbenzylidene)-3-indenyl methyl bromide The product of Step B, is dehydrogenated as described in Example 3, Step A.

Step D: 5-Fluoro-2-methyl-1-(4'-methylsulfinylbenzylidene)-indenyl acetic acid

The product of Step B (10.54 g., 0.025 mole) is taken up in 100 ml. anhydrous ether, and added dropwise under nitrogen, stirring, and cooling, to 6.5 g. activated magnesium turnings in 100 ml. ether. When formation of the Grignard reagent is complete, a current of dry carbon dioxide is passed over the stirred surface until the Gilman test is negative. The reaction product is quenched with 50 ml. 2N acetic acid, and the ether phase is separated, washed with water, dried over sodium sulfate and chromatographed on silica gel to recover the 3-indenyl acetic acid, which after recrystallization, has m.p. 184°–186°C.

EXAMPLE 10

Step A: 5-Fluoro-3-hydroxymethylene-2-methyl-1-(4'-methylsulfinylbenzyl)indene

The product of Example 2, Step A, is taken up in 200 ml. anhydrous ether and treated with 8.2 g. (0.11 mole) ethyl formate and 8.0 g. (0.114 mole) fresh dry potassium ethoxide. The mixture is refluxed with stirring under nitrogen for 4 hrs., then poured into water. The aqueous phase is extracted with ether to remove any inert materials, and acidified with sulfuric acid, forming an orange emulsion. The emulsion is extracted with ether until the aqueous phase is colorless; the extract is washed free from acid with water, dried over sodium sulfate, and evaporated, leaving an orange oil which is used at once.

Step B: 5-Fluoro-2-methyl-1-(4'-methylsulfinylbenzylidene)-3-indenyl acetic acid The product of Step A is charged to the glass liner of a silver-cladded steel bomb along with 5 ml. water, 5.5 g. nickel carbonyl, 1.5 g. nickel chloride hexahydrate, 1 ml. conc. hydrochloric acid, and enough dioxane to bring the hydroxymethyleneindene into partial solution. Carbon monoxide is pumped in to 900 p.s.i. The bomb temperature is then raised to 250°C. and maintained until the hot pressure no longer falls. The bomb is then cooled and vented. The contents of the bomb are emptied into 500 ml. water, made alkaline with sodium hydroxide, filtered from insoluble sludge, and the filtrate is acidified. The precipitate of crude 5-fluoro-2-methyl-1-(4'-methylsuflinylbenzylidene)-3-indenyl acetic acid is purified by recrystallization, m.p. 184°–186°C.

EXAMPLE 11

Step A: 5-Fluoro-2-methyl-1-(4'-methylsulfinylbenzyl)-3-indene carboxylic acid

A flask fitted with magnetic stirrer, nitrogen sweep, reflux condenser topped with a Dry-Ice cold finger, and dropping funnel is charged under careful exclusion of air, with 25 ml. nickel carbonyl in 80 ml. absolute ethanol. The funnel is charged with the diazoindene solution from Example 5, Step A. The heater temperature is raised to 55°–60°C., and the diazoindene solution is added over 30 minutes, with continuous stirring. Fifteen minutes after the last of the diazoindene has reacted, the solvents and excess nickel carbonyl are swept into a dry ice trap under reduced pressure, and replaced with 200 ml. normal alcoholic potassium hydroxide. Refluxing is resumed for 2 hours, after which the suspension is diluted with 200 ml. water and filtered from sludge. Acidification with sulfuric acid precipitates the crude indene 3-carboxylic acid, which is purified by recrystallization.

Step B: 5-Fluoro-2-methyl-1-(4'-methylsulfinylbenzylidene)-3-indene carboxylic acid The product of Step A is dehydrogenated by the process described in Example 3, Step A.

Step C: 5-Fluoro-2-methyl-1-(4'-methylsulfinylbenzylidene)-3-indenyl acetic acid The product of Step B is refluxed with excess thionyl chloride until there is no further evolution of hydrogen chloride and sulfur dioxide. The volatiles are removed by heating under dry nitrogen sweep, and the acid chloride is taken up in sufficient ether. This solution is added dropwise to the equivalent amount of diazomethane in ether. After standing overnight, the diazoketone is recovered by evaporation of the ether and recrystallization from absolute alcohol.

To the diazoketone (20.64 g., 0.05 mole) in 150 ml. absolute ethanol is added at 55°–60°C. under stirring, in small portions, a suspension of 0.7 g. freshly precipitated silver oxide in 30 ml. absolute ethanol, as nitrogen evolution indicates. When reaction is complete, the suspension is filtered from silver sludge, and concentrated to crystallization, thereby yielding 5-fluoro-2-methyl-1 -(4'-methylsulfinylbenzylidene)-3-indenyl acetic acid, m.p. 184°–186°C.

EXAMPLE 12

Step A: 5-Fluoro-2-methyl-1-(4'-methylsulfinylbenzyl)-3-indenyl ethanol

The indene from Example 2, Step A, is hydroxy alkylated with ethylene oxide by standard techniques.

Step B: 5-Fluoro-2-methyl-1-(4'-methylsulfinylbenzylidene)-3-indenyl acetic acid 17.2 Grams (0.05 mole) of the indenylethanol from Step A is aerated in 500 ml. of n-heptane at 60°C. in the presence of 2 g. of platinum under vigorous agitation for about 15 min. to uptake of a mole of oxygen. [Filtration and concentration at this point gives the crude 3-indenyl acetaldehyde.]

Continuation of the aeration in the presence of an equivalent of bicarbonate to total cessation of oxygen uptake gives the sodium salt of the 3-indenyl acetic acid. Acidification liberates the free 3-indenylacetic acid, m.p. 184°–186°C. after recrystallization.

EXAMPLE 13

The 3-indenyl acetaldehyde of Example 12, Step B, (6.84 g., 0.02 mole) in 100 ml. of 2.5 N NaOH containing the silver oxide-cuprous oxide catalyst of Harris and Moyle [*Org. Syn.*, 36, 36 (1956)] is stirred under a stream of oxygen at 50°C. for 30 min. Filtration, cooling and acidification gives the 3-indenylacetic acid, m.p. 184°–186°C. after recrystallization.

EXAMPLE 14

Step A: 5-Fluoro-2-methyl-1-(4'-methylsulfinylbenzylidene)-3-indenyl acetonitrile The 3-bromomethyl indene from Example 9, Step C, is treated with sodium cyanide in dimethyl sulfoxide by standard techniques.

Step B: 5-Fluoro-2-methyl-1-(4'-methylsulfinylbenzylidene)-3-indenyl acetic acid 8.5 Grams (0.025 mole) of the indenyl acetonitrile from Step A is boiled with 30% sulfuric acid for one hour. The mixture is extracted with ethyl acetate, the extract dried and evaporated to give the 3-indenylacetic acid, m.p. 184°–186°C.

EXAMPLE 15

Step A: 5-Fluoro-2-methyl-1-(4'-methylsulfinylbenzylidene)-3-indenyl-$\beta$-nitroethane By employing the procedure substantially as described in Example 1, Step G, but substituting for the glycolic acid used therein, an equivalent amount of 2-nitroethanol, there is produced the indenyl-$\beta$-nitroethane.

Step B: 5-Fluoro-2-methyl-1-(4'-methylsulfinylbenzylidene)-3-indenyl acetic acid 3.71 Grams (0.01 mole) of the indenyl nitroethane from Step A is heated in 50 ml. of conc. hydrochloric acid at 130°C. in an autoclave for 3 hours. Cooling and filtration gives the free crude indenylacetic acid. Recrystallization from ethyl acetate-petroleum ether gives material with m.p. 184°–186°C.

EXAMPLE 16

Step A: 5-Fluoro-2-methyl-1-(4'-methylsulfinylbenzylidene)-3-indenyl-glyoxylic acid The product of Example 2, Step A, on treatment with diethyl oxalate and a base under standard conditions provides 5-fluoro-2-methyl-1-(4'-methylsulfinylbenzyl)-3-indenyl glyoxylic acid, which on dehydrogenation as described in Example 3, Step A, gives the subject product. Step B: 5-Fluoro-2-methyl-1-(4'-methylsulfinylbenzylidene)-3-indenyl acetic acid 9.3 Grams (0.025 mole) of the glyoxylic acid from Step A in 100 ml. of abs. ethanol is treated with an excess of hydrazine hydrate and then diluted with a solution of sodium in absolute ethanol in the cold. The mixture is heated gradually to distill off all liquids and the residue is heated 15 min. at 200°C. and then cooled. Dilution with dilute ethanolic hydrochloric acid gives the indenylacetic acid, m.p. 184°–186°C. after recrystallization.

EXAMPLE 17

Step A: 5-Fluoro-2-methyl-1-(4'-methylsulfinylbenzylidene)-3-indenylglyoxime

Treatment of the product of Example 2, Step A, with acetyl chloride provides 3-acetyl-5-fluoro-2-methyl-1-(4'-methylsulfinylbenzyl)indene, which on dehydrogenation as described in Example 3, Step A, yields the subject 3-acetylindene, which on nitrosation with nitrous acid produces the $\alpha$-oximino ketone.

Step B: 5-Fluoro-2-methyl-1-(4'-methylsulfinylbenzylidene)-3-indenyl acetic acid 18.5 Grams (0.05 mole) of the glyoxime from Step A is heated with hydrazine and potassium hydroxide in diethylene glycol at 190°C. to cessation of distillation. Slow cooling under a stream of air followed by acidification gives the 3-indenylacetic acid, m.p. 184°–186°C. after recrystallization.

EXAMPLE 18

Step A: 5-Fluoro-2-methyl-1-(4'-methylsulfinylbenzyl)-3-indenyl-$\alpha$-hydroxyacetonitrile The hydroxymethylene derivative from Example 10, Step A, on treatment with hydrogen cyanide, by standard Kiliani synthesis produces the subject cyanohydrin.

Step B: 5-Fluoro-2-methyl-1-(4'-methylsulfinylbenzylidene)-3-indenyl acetic acid 8.9 g. Of the cyanohydrin from Step A is hydrolyzed to the $\alpha$-hydroxy acid by stirring in 70 ml. of glacial acetic acid containing 8.9 g. of 70% perchloric acid, adding a gram of 10% palladium on carbon and shaking under hydrogen to uptake of one mole of room temperature (ca. 6 hours). Filtration, neutralization with sodium bisulfite, reacidification and extraction with benzene gives the crude 3-indenyl acetic acid. Recrystallization from ethyl acetate gives the acid, m.p. 184°–186°C.

EXAMPLE 19

Step A: Ethyl-5-fluoro-2-methyl-1-(4'-methylsulfinylbenzylidene)-3-indenyl-$\alpha$-cyanoacetate The 3-bromo compound from Example 6, Step A, is treated with an equivalent amount of the sodio-derivative of ethyl cyanoacetate by standard techniques to provide the subject 3-indenyl-$\alpha$-cyanoacetate.

Step B: 5-Fluoro-2-methyl-1-(4'-methylsulfinylbenzylidene)-3-indenyl acetic acid 10.2 g. (0.025 Mole) of the $\alpha$-cyanoacetate from Step A is refluxed 12 hours in a 1:2 mixture of 20% hydrochloric acid-acetic acid to the disappearance of the nitrile band in the infra-red of an aliquot. Evaporation, dissolution in bicarbonate, carbon-treatment and acidification gives the 3-indenyl acetic acid. Recrystallization raises the m.p. to 184°–186°C.

EXAMPLE 20

Step A: Diethyl 5-fluoro-2-methyl-1-(4'-methylsulfinylbenzylidene)-3-indenyl-$\alpha$-malonate The 3-bromo compound from Example 6, Step A, is treated with an equivalent amount of the sodio-derivative of diethyl malonate by standard techniques to provide the subject 3-indenyl-$\alpha$-malonate.

Step B: 5-Fluoro-2-methyl-1-(4'-methylsulfinylbenzylidene)-3-indenyl acetic acid 15.2 g. (0.033 Mole) of the 3-indenyl malonate from Step A in 100 ml. of ethanol is treated briefly on the steam cone with 20% caustic until in solution. Acidification with 50% sulfuric acid gives immediate decarboxylation and precipitates the 3-indenyl acetic acid, m.p. 184°–186°C. after recystallization.

EXAMPLE 21

Step A: 5-Fluoro-2-methyl-3-methylene-1-(4'-methylthiobenzyl)indene

The product of Example 1, Step F, is taken up in 200 ml. anhydrous methanol, two equivalents of dry sodium methoxide are added (at which point double-bond migration occurs) and dry formaldehyde gas is passed in to the calculated weight gain. The mixture is allowed to stand at room temperature until all formaldehyde has been consumed, after which the product is quenched with water, and the somewhat sensitive fulvene is extracted with ether, dried, and preserved under dry nitrogen in the cold until used.

Step B: 3-[5-Fluoro-2-methyl-1-(4'-methylthiobenzyl)-indenylmethyl]cyclohexyl ketone A dry 500 ml. flask fitted with thermometer well and magnetic stirrer is charged with 8.21 g. dry cyclohexene in 20 ml. anhydrous tetrahydrofuran. The flask is cooled to 0°C., the stirrer is started, the system is flushed with dry nitrogen, and a commercial 1M solution of diborane in tetrahydrofuran (25 ml., 0.05 mole $BH_3$) is added dropwise. The solution is allowed to reach room temperature under stirring, then 17.77 g. (0.05 mole) of the fulvene from Step A in 200 ml. dry tetrahydrofuran is added. The solution is heated to 45°C. for 1 hour to complete the hydroboration; 1.5 ml. water is added and carbon monoxide is passed through for 24 hours, the temperature being maintained at 45°C. At the end of this time, 20 ml. 3M sodium acetate is introduced, the temperature is raised to 50°–60°C., and 17 ml. 30% hydrogen peroxide is added dropwise; one-half hour later, the tetrahydrofuran is removed under reduced pressure, and the ketone is extracted with methylene chloride (250 ml. altogether). The methylene chloride extract is washed with water, dried over sodium sulfate, and used in the next step.

Step C: 3-[5-Fluoro-2-methyl-1-(4'-methylthiobenzylidene)-indenylmethyl]cyclohexyl ketone The product of Step B is dehydrogenated as described in Example 3, Step A.

Step D: 5-Fluoro-2-methyl-1-(4'-methylsulfinylbenzylidene)-3-indenyl acetic acid The product of Step C is treated with 2 mole-equivalents of freshly sublimed m-chloroperbenzoic acid and 6-mole-equivalents of trifluoroacetic acid. The mixture is set in the refrigerator and checked from time to time until the test for peroxide is negative. The methylene chloride is then stripped off, and the residue is saponified by gentle heating with 2N aqueous-alcoholic potassium hydroxide. Cyclohexanol and other neutral materials are extracted with methylene chloride. The aqueous phase is acidified with glacial acetic acid and extracted with methylene chloride to recover the above crude acid, which is purified by recrystallization from the same solvent.

EXAMPLE 22

Step A: 5-Fluoro-2-methyl-1-(4'-methylsulfinylbenzyl)-3-(2'-propanone)indene

Condensation of chloroacetone with the product of Example 2, Step A, in the presence of a base provides the subject indenylpropanone.

Step B: 5-Fluoro-2-methyl-1-(4'-methylsulfinylbenzylidene)-3-indenyl acetic acid 11.9 g. (0.033 Mole) of the methyl ketone from Step A in 100 ml. of dioxane is treated with a 10% excess hypochlorite solution containing 2.0 g. of sodium hydroxide for 1 hour at 35°C. The excess oxidant is decomposed with 10% sodium bisulfite solution and the free 3-indenyl acetic acid precipitated at pH 2 with hydrochloric acid. Recrystallization from ethyl acetate-petroleum ether gives the acid m.p. 184°–186°C.

EXAMPLE 23

Step A: 3-Allyl-5-fluoro-2-methyl-1-(4'-methylsulfinylbenzyl)indene

Condensation of the product of Example 2, Step A, with allyl chloride in the presence of a base provides the subject allylindene.

Step B: 5-Fluoro-2-methyl-1-(4'-methylsulfinylbenzylidene)-3-indenyl acetic acid 6.8 g. (0.02 Mole) of the 1-allyl derivative from Step A is ozonized with a slow stream of ozone in 200 ml. of 50% acetic acid under cooling. After an hour, and a mole of ozone has been consumed, 30% hydrogen peroxide is added to complete the oxidation. The excess oxidant is then neutralized with dilute bisulfite. The 3-indenyl acetic acid is isolated by evaporation in vacuo and extraction. Recrystallization gives the acid, m.p. 184°–186°C.

EXAMPLE 24

Step A: Methyl 5-fluoro-2-methyl-1-(4'-methylthiobenzyl)-3-indenyl-α-propionate

To a 1-liter flask charged with 500 ml. anhydrous pyridine and fitted with nitrogen inlet, magnetic stirrer, and reflux condenser, there is added 14.41 g. (0.2 mole) freshly-distilled β-propiolactone and 68.48 g. (0.2 mole) 5-fluoro-2-methyl-1-(4'-methylthiobenzyl)indene. Under continuous nitrogen flow the mixture is stirred and heated to gentle reflux until a probe shows no further development of infra-red carboxyl absorption. The product is allowed to reach room temperature under nitrogen, then 25 g. (excess) thionyl chloride is added dropwise while maintaining stirring and cooling. This is followed by 30 ml. (excess) dry methanol, and the mixture is heated to slight methanol reflux for 3 hours. Finally, the entire material is poured into 1 liter 6N hydrochloric acid, and the precipitated ester is taken up in benzene. After water wash and drying, the ester is crystallized from benzene-hexane.

Step B: Methyl-5-fluoro-2-methyl-1-(4'-methylthiobenzylidene)-3-indenyl-β-propionate The product from Step A is dehydrogenated as described in Example 3, Step A.

Step C: Diphenyl β-[5-fluoro-2-methyl-1-(4'-methylthiobenzylidene)-3-indenyl]ethyl carbinol To a solution containing 0.21 mole commercial phenylmagnesium bromide in 500 ml. anhydrous ether under nitrogen, there is added a solution of 42.95 g. (0.1 mole) of ester from Step B in 500 ml. anhydrous ether, dropwise with continuous stirring and cooling. When heat evolution has subsided, the reaction mixture is refluxed for 3 hours, then allowed to stand overnight at room temperature. Quenching is done with 100 ml. 2.5 N hydrochloric acid; the ether layer is separated, washed with water, dried, evaporated, and the residue is chromatographed on silica gel to obtain the pure diphenyl carbinol.

Step D: 1,1-Diphenyl-3-[5-fluoro-2-methyl-1-(4'-methylsulfinylbenzylidene)-3-indenyl]prop-1-ene The product of Step C is charged to 300 ml. anhydrous dimethyl sulfoxide in a distilling flask with a short fractionating column and nitrogen sweep. While a slow current of nitrogen is passed through, the flask contents are maintained at 160°–170°C. as long as any water and dimethyl sulfide distil. During this time both dehydration of the tertiary alcohol to olefin and oxidation of methylthioether to methyl sulfoxide occurs. When the process is completed, dimethyl sulfoxide is evaporated under vacuum, and sulfinyl olefin is recovered by silica-gel chromatography.

Step E: 5-Fluoro-2-methyl-1-(4'-methylsulfinylbenzylidene)-3-indenyl acetic acid The olefin from Step D (26.73 g., 0.05 mole) is dissolved in 250 ml. glacial acetic acid, and under stirring, a solution of 11 g. (slight excess over 0.1 mole) chromic anhydride in 15 ml. water is added at room temperature. The solution is allowed to remain under stirring until the peroxide-ether test for chromic acid has become very faint. At this point, acetic acid is removed under vacuum, and the residue is slurried with 200 ml. 10% sulfuric acid on the steam-cone for 1 hour. The suspension is extracted with ether, the ether is washed with water containing a little sulfur dioxide to ensure destruction of chromic acid, and the above acid is extracted from benzophenone and other inert materials by means of normal sodium hydroxide. After decolorization of the alkaline extract with charcoal, the free acid is precipitated with dilute sulfuric acid.

EXAMPLE 25

Step A: 3-Acetyl-5-fluoro-2-methyl-1-(4'-methylsulfinylbenzyl)indene

Treatment of the product of Example 2, Step A, with acetyl chloride under standard conditions provides the subject 3-acetylindene.

Step B: 5-Fluoro-2-methyl-1-(4'-methylsulfinylbenzylidene)-3-indenyl acetic acid 8.55 g. (0.025 Mole) of the ketone from Step A is heated with 50 ml. of ammonium hydroxide, 15 g. of sulfur and 15 ml. of pyridine for 6 hours at 160°C. in a stainless steel autoclave. The mixture is cooled, evaporated to dryness and the residue digested in 25% caustic on the steam bath for a few minutes. Cooling and acidification to pH 3 with hydrochloric acid gives the 3-indenyl acetic acid. Recrystallization raises the m.p. to 184°–186°C.

EXAMPLE 26

Step A: 3-Chloroacetyl-5-fluoro-2-methyl-1-(4'-methylsulfinylbenzyl)indene

Treatment of the product of Example 2, Step A, with chloroacetyl chloride under standard conditions provides the 3-chloroacetylindene.

Step B: 5-Fluoro-2-methyl-1-(4'-methylsulfinylbenzylidene)-3-indenyl acetic acid 3.76 g. (0.01 Mole) of the 1-chloroacetyl indene from Step A is refluxed in 100 ml. of xylene containing 0.01 mole of powdered caustic for 8 hours. Cooling and extraction with 5% hydrochloric acid leaves an organic layer which on concentration precipitates the 3-indenyl acetic acid, m.p. 184°–186°C. after recrystallization.

EXAMPLE 27

Step A: Ethyl 5-fluoro-2-methyl-1-(4'-methylsulfinylbenzylidene)-3-indenylacetate Following the procedure of Example 14, Steps A and B, but employing ethanolic sulfuric acid in Step B in place of the 30% sulfuric acid, the subject ethyl ester is obtained. Step B: 5-Fluoro-2-methyl-1-( -methylsulfinylbenzylidene)-3-indenyl acetic acid 7.7 g. (0.02 Mole) of the ethyl ester is warmed with 100 ml. of 50% aqueous ethanol containing a few drops of sulfuric acid. The acids are neutralized with bicarbonate, the solution carbon-treated and the free 3-indenyl acetic acid is reprecipitated with dilute hydrochloric acid, and has m.p. 184°–186°C.

EXAMPLE 28

Step A: 5-Fluoro-2-methyl-1-(4'-methylsulfinylbenzylidene-3-indenylacetamide

Following the procedure of Example 14, Steps A and B, but employing concentrated sulfuric acid in Step B in place of the 30% sulfuric acid, the subject indenylacetamide is obtained.

Step B: 5-Fluoro-2-methyl-1-(4'-methylsulfinylbenzylidene)-3-indenyl acetic acid 8.85 g. (0.025 Mole) of the amide is stirred with 100 ml. of 20% caustic till solution is complete. Carbon-treatment and acidification with mineral acid gives the free 3-indenyl acetic acid, m.p. 184°–186°C. after recrystallization.

EXAMPLE 29

Step A: Trimethylsilyl 5-fluoro-2-methyl-1-(4'-methylsulfinylbenzylidene-3-indenylacetate To a suspension of 4.8 g. of 50% sodium hydride in 20 ml. anhydrous dimethylformamide is added a solution of 0.1 mole of 5-fluoro-2-methyl-1-(4'-methylsulfinylbenzylidene)-3-indenyl acetic acid in 80 ml. of anhydrous dimethylformamide over 20 minutes at 10°–20°C. The reaction mixture is cooled to 0°C. and 10.9 g. trimethyl chlorosilane is added dropwise with stirring while maintaining the temperature between 0°–10°C. by external cooling. After ageing the reaction for one additional hour the trimethylsilyl ester is isolated.

Step B: 5-Fluoro-2-methyl-1-(4'-methylsulfinylbenzylidene)-3-indenyl acetic acid 21.5 g. (0.05 Mole) of the trimethylsilyl ester is stirred in 300 ml. of ice-water containing 5 ml. of acetic acid. The precipitate is filtered and recrystallized from ethyl acetate to give the pure free 3-indenyl acetic acid, m.p. 184°–186°C.

EXAMPLE 30

Step A: t-Butyl 5-fluoro-2-methyl-1-(4'-methylsulfinylbenzylidene)-3-indenylacetate 5-Fluoro-2-methyl-1-(4'-methylsulfinylbenzylidene)-3-indenyl acetic acid is esterified with t-butanol by standard procedures.

Step B: 5-Fluoro-2-methyl-1-(4'-methylsulfinylbenzylidene)-3-indenyl acetic acid 10.3 g. (0.025 Mole) of the t-butyl ester in 100 ml. of benzene containing 500 mg. of p-toluenesulfonic acid is refluxed to cessation (ca. 1 hr.) of evolution of isobutylene. The solution is washed with a little water, decolorized with a gram of charcoal, dried, and concentrated to give the free 3-indenyl acetic acid, m.p. 184°–186°C.

EXAMPLE 31

Step A: Benzyl 5-fluoro-2-methyl-1-(4'-methylsulfinylbenzylidene)-3-indenyl acetate 5-Fluoro-2-methyl-1-(4'-methylsulfinylbenzylidene)-3-indenyl acetic acid is esterified with benzyl alcohol by standard procedures.

Step B: 5-Fluoro-2-methyl-1-(4'-methylsulfinylbenzylidene)-3-indenyl acetic acid 11.3 g. (0.025 Mole) of the benzyl ester of acetic acid is hydrogenolyzed with one equivalent of hydrogen in the presence of 5 g. of 5% palladium on carbon. The catalyst is filtered and the filtrate evaporated in vacuo. Crystallization of the residue from ethyl acetate gives the free 3-indenyl acetic acid, m.p. 184°–186°C.

What is claimed is:

1. A compound of structural formula:

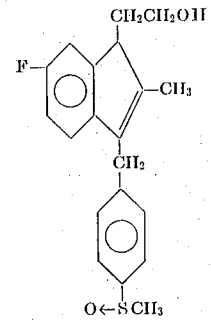

* * * * *